Jan. 29, 1957 T. J. McKIFF 2,779,361
SAWING TOOL FOR CUTTING CIRCULAR HOLES
Filed March 17, 1954
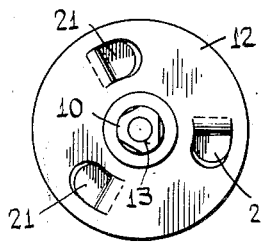
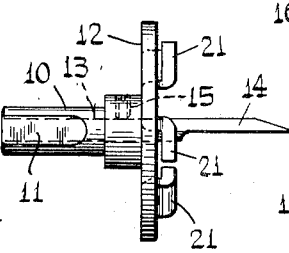
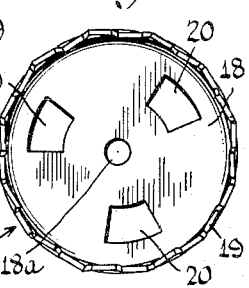
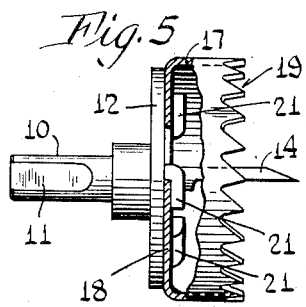
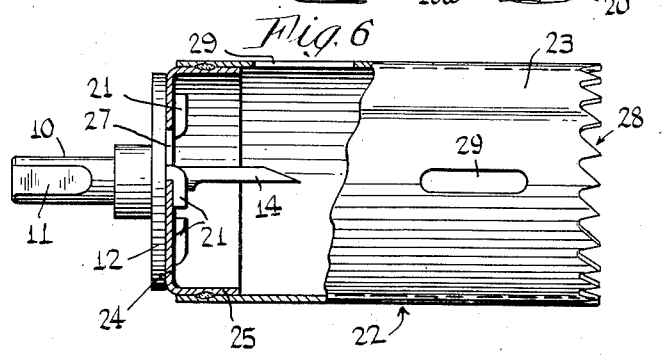
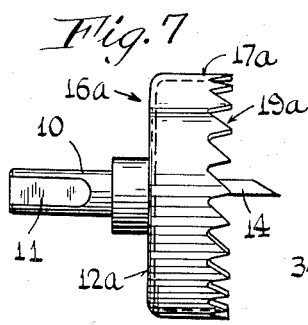
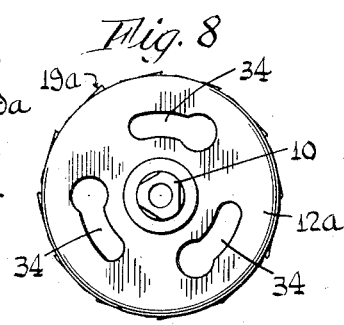
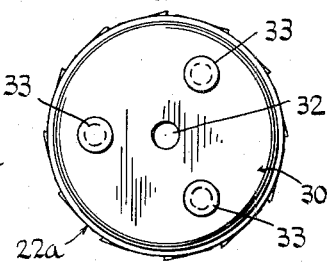
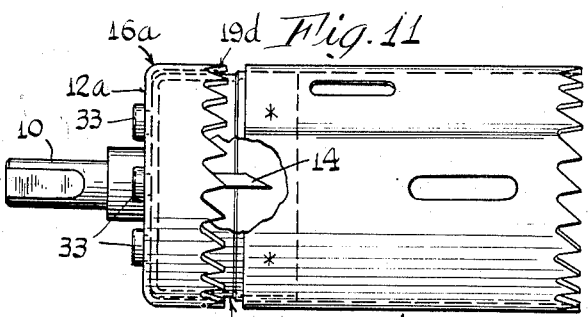
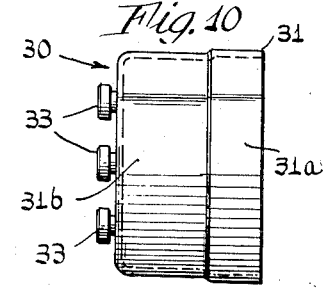
INVENTOR.
Thomas J. McKiff
BY
Johnson and Kline
ATTORNEYS United States Patent Office 2,779,361
Patented Jan. 29, 1957

2,779,361

SAWING TOOL FOR CUTTING CIRCULAR HOLES

Thomas J. McKiff, Stratford, Conn., assignor to Miller Manufacturing Corp., Stratford, Conn., a corporation of Connecticut Application March 17, 1954, Serial No. 416,797

10 Claims. (Cl. 143—85)

The present invention relates to a sawing tool for cutting circular holes.

Heretofore, such tools have been provided in which a starter drill is mounted on a holder for a circular saw to start the hole and to guide the saw during the cutting operation. The difficulty with such constructions is that the circular saw was usually of a relatively short axial length so as to be located in back of the drill so that its use was limited to relatively shallow cuts and if deeper cuts were required, it was necessary to chisel out the cut portion and continue the cutting operation.

The present invention overcomes this difficulty by providing a simple, highly efficient cutting device capable of cutting large circular holes through relatively thick members with a minimum of effort. This is accomplished by providing a driver on which is mounted a tubular starter saw cooperating with the starting drill to start the cutting of the hole and by providing an elongate tubular finishing saw adapted to be detachably connected to the driver after the hole has been started so as to project beyond the end of the drill with the projecting end provided with saw teeth. The finishing saw is preferably made from tubing of substantially the same diameter as the starter saw so as to fit into the cut started thereby and is of the desired length as to complete the cut without the necessity of removing the cut portion from the tubular saw until after the cutting operation has been completed.

In accordance with the present invention, the starter saw may be detachably connected to the driver or may be integral with the driver.

A feature of the invention resides in the simplicity of the construction of the detachable connection whereby the finishing saw and/or starter saw can be readily detachably connected to the driver to be securely held thereto and driven thereby.

Another feature resides in the simple and effective construction of the tubular saw member whereby the cut portion can be easily removed therefrom.

Other features and advantages of the invention will be apparent from the specification and claims when considered in connection with the drawings in which:

Figure 1 shows a bottom view of the driver member.

Fig. 2 shows a side view of the driver member with the starter drill in position.

Fig. 3 shows a side view of the starter saw.

Fig. 4 shows a top plan view of the starter saw of Fig. 3.

Fig. 5 shows the starter saw connected to the driver.

Fig. 6 shows the finishing saw connected to the driver.

Fig. 7 shows a side view of the driver and integral starter saw.

Fig. 8 is a bottom view of the starter saw of Fig. 7.

Fig. 9 is a bottom view of the finishing saw for use with an integral starter saw.

Fig. 10 is a side view of the base plate for the finishing saw of Fig. 9.

Fig. 11 is a view of the integral starter saw and the finishing saw on the driver.

Fig. 12 shows a fragmentary view of another tooth arrangement.

As shown in the drawings, the saw of the present invention comprises a shank 10 having chuck-engaging faces 11 thereon to prevent slipping of the shank in the chuck or other suitable driving means and has a driver plate 12 secured to the end thereof. The shank and plate have an axial bore 13 into which a starting drill 14 may be inserted and locked in place by set screw 15.

In the form of the invention shown in Figs. 1 through 6 a starter saw and a finishing saw are both detachably connected to the driver plate. As shown in Figs. 3 through 5 the starter saw 16 comprises a cup-shaped member having tubular side walls 17 and a base plate 18 at its inner end and cutting teeth 19 at its other end. While any suitable means may be provided for securing the base plate of the saw to the driver plate, in the form of the invention herein illustrated, this means comprises apertures in one plate cooperating with projections on the other plate. As shown in Fig. 4, the base plate 18 is provided with a central aperture 18a adapted to slide over the drill and have a central bearing on the shank of the drill and is provided with suitably spaced apertures 20 adapted to coopertae with projecting offset fingers 21 lanced out of the driver plate and projecting therefrom so as to overlie the base plate, as shown in Fig. 5, when they are inserted through the apertures 20 in the base plate and the starter saw rotated with respect to the driver plate. This connection not only clamps the base plate to the driver plate but also forms the driving connection for the starter saw.

As is shown in Fig. 5, the starter saw is of such a length that the teeth are located behind the cutting point of the drill so that the drill will first start the guide hole and then serve as a guide for the cutting saw during the cutting operation forming the large circular opening.

In accordance with the present invention, after the saw cut has been started, the starter saw and drill are removed from the cut and the starter saw detached from the driver plate and replaced with an elongate tubular finishing saw 22 having a length sufficient to completely cut through the piece in which the circular aperture is to be formed.

The finishing saw, as shown in Fig. 6, comprises an elongate tubular member 23. While this member may be formed by deep drawing or by bending a sheet into tubular form, it is preferably formed from steel tubing which provides a stiff rigid saw. At one end there is connected a base plate 24 having longitudinal extensions, herein illustrated as flanges 25, disposed within and welded or otherwise secured to the walls of the tubular member. The base plate 24 is similar in construction to base plate 18 and is provided with a central drill-receiving aperture and spaced finger-receiving apertures 27 adapted to cooperate with the fingers 21 to clamp the base plate 24 to the drive plate and form a driving connection for the finishing saw. The other end of the tubular member is provided with suitable saw teeth 28 which are located beyond the end of the starter saw.

The teeth on the two saws can be of any desired type and can be set in any desired manner. In the form shown in Fig. 4, teeth 19a are set out and teeth 19b are set in while in the form shown in Fig. 12 teeth 19a and 19b are separated by a straight cut-clearing tooth 19c.

An advantage of the present invention resides in the fact that, by cutting the tubing to the desired length, finishing saws can be readily made in varying lengths so that they will, by proper selection, always have sufficient length to cut through any desired object without having to remove the cut-out portion or plug during the cutting operation.

As shown by comparison of Figs. 5 and 6, the finishing saw is of substantially the same diameter as the starter saw so that the teeth at the end thereof will readily fit in the cut started by the starter saw so as to steady and guide the saw during the remaining cutting operations.

While the plug removed by the saw could be removed by driving it out of the long tubular finishing saw by means inserted through apertures 27, in the illustrated form of the invention, elongate slots 29 are provided in the tubular saw to extend longitudinally thereof and preferably in staggered relation and through which sharp instruments, not shown, may be inserted to move the cut plug along and from within the tubular saw without damage to the driving connection.

In the form of the invention shown in Figs. 7 through 11, the shank 10 has the starter saw 16a secured thereto so as to be integral with the driver plate 12a. As shown in Fig. 7, the side wall 17a is of such a length that the teeth 19d are disposed behind the end of the drill 14 and functions in the manner set forth above. After the starter saw has made the starting cut, it is withdrawn and a finishing saw 22a is connected thereto so as to project beyond the end of the starting saw and the drill and has a diameter substantially equal to the diameter of the starter saw as shown in Fig. 11. It is of such a length that it will complete the cut through the member being cut. The finishing saw in this form of the invention is similar to that shown in Fig. 6 except that it is provided with a base plate 30 having stepped, longitudinally extending flanges 31, as shown in Fig. 10, in which the end portion 31a is of a diameter adapted to fit within the tubular finishing saw and be secured thereto by welding or the like and the portion 31b of reduced diameter connects with the base plate and projects beyond the end of the tubular body of the saw so as to fit within the starter saw and position the base plate, which has a central drill-receiving aperture 32 therein, adjacent the driver plate 12a as shown in Fig. 11. The detachable connection for the finishing saw, as illustrated in this form of the invention, comprises shouldered studs 33 projecting from the base plate 30 to pass through and cooperate with keyhole slots 34 in the driver plate 12a when the finishing saw is positioned as shown in Fig. 11 so as to hold the finishing saw in position and form the drive means therefor.

From the foregoing it will be seen that the present invention overcomes the difficulties heretofore encountered for it is merely necessary to employ the starter saw sufficiently to start the cut and thereafter the finishing saw can be used to complete the cut and remove the cut plug from the member without the necessity of chiseling out the plug periodically to permit the starter saw to cut deeper into the member.

Furthermore, the present invention provides an arrangement whereby finishing saws of varying length can be employed as required by the piece to be cut, thus producing great versatility in the saw.

Because the starter saw and finishing saw can be fabricated from stampings, deep drawn members and tubular stock, they can be easily and quickly manufactured and the tubular construction of the saws provides a very rigid sawing element. By employing a simple, yet effective detachable connection for the saws, interchanging of the saw units can be greatly facilitated and yet the saws will be held firmly in position and provided with an adequate driving connection.

Variations and modifications may be made within the scope of the claims and portions of the improvements may be used without others.

I claim:

1. A cutting tool for cutting circular holes comprising a driving shank having an axial bore in one end thereof; a guide drill having a shank adapted to be mounted in said bore with the cutting end projecting beyond the end of the driving shank to guide said tool during a starting cut; a driver plate secured to said one end of the driving shank to project laterally thereof; a tubular starter saw carried by the driver plate and having teeth disposed rearwardly of the cutting end of the drill; and an elongate tubular finishing saw having a base plate at one end adapted to be connected to said driver plate after the starter saw has formed the starting cut and having teeth at the other end located beyond the end of the drill, said finishing saw being of substantially the same diameter as the starting saw, the teeth of the finishing saw being adapted to fit into the cut formed by the starting saw to finish the cut started thereby.

2. The invention as defined in claim 1, wherein the starter saw has a base plate detachably connected to the driver plate.

3. The invention as defined in claim 2 wherein the detachable connection between the driver plate and base plate comprises apertures and cooperating projections adapted to interlock and hold the base plate to the driver.

4. The invention as defined in claim 1 wherein the driving connection between the driver plate and base plate comprises apertures formed in one plate and offset fingers lanced from the other plate and projecting through said apertures and into interlocked relation with said one plate.

5. The invention as defined in claim 1 wherein the driving connection between the driver plate and base plate comprises keyhole slots in one plate and shouldered studs projecting from the other plate into interlocked relation with said keyhole slots upon relative rotation of said plates.

6. The invention as defined in claim 1 wherein the starting saw is formed integral with the driver plate and wherein the base plate of the finishing saw has a projection of reduced diameter to fit within the starting saw.

7. A cutting tool for cutting circular holes comprising a driving shank having an axial bore in one end thereof; a guide drill having a shank adapted to be mounted in said bore with the cutting end projecting beyond the end of the driving shank to guide said tool during a starting cut; a driver plate secured to said one end of the driving shank to project laterally thereof; a starter saw comprising a tubular body having a base plate at one end and cutting teeth at the other end; and cooperating interlocking means on the cooperating faces of the driver plate and base plate operative upon relative rotative movement between said driver plate and base plate for detachably securing the saw to the driver plate with the teeth on said starter saw located rearwardly of the cutting end of the drill.

8. A cutting tool for cutting circular holes comprising a driving shank having a driver plate secured to said one end of the driving shank to project laterally thereof; a tubular saw having a base plate at one end and having cutting teeth at the other end; and interlocking means on the cooperating faces of said driver plate and base plate operative upon relative rotation of said plates for detachably securing said plates together.

9. A saw adapted to be connected to a driver plate comprising a tubular body having a base plate connected to one end and having cutting teeth at the other end, said base plate having bayonet lock means thereon for interconnection with said driver plate upon relative rotation of said plates.

10. A cutting tool for cutting circular holes comprising a driving shank having an axial bore in one end thereof; a guide drill having a shank adapted to be mounted in said bore with the cutting end projecting beyond the end of the driving shank to guide said tool during a starting cut; a driver plate secured to said one end of the driving shank to project laterally thereof; a tubular starter saw having a base plate at one end and cutting teeth at the other end, said base plate having a central aperture to pass over the shank of the drill and said base plate and driver plate having cooperating apertures and projections adapted to interlock upon predetermined relative rotation of the base and driver plates, said starter saw when positioned having its teeth disposed rearwardly of the cutting end of the drill; and a finishing saw comprising an elongate tubular body having a base plate at one end similar to the base plate on the starter saw and adapted to be connected to said driver plate when the starter saw is removed therefrom and having teeth at the other end located beyond the end of the drill, said body of the finishing saw being of substantially the same diameter as the starting saw whereby the teeth of the finishing saw fit into the cut formed by the starting saw to finish the cut started thereby and said body having elongate spaced apertures therein adapted to receive sharp implements whereby the sawed out piece can be removed from the tubular body.

References Cited in the file of this patent

UNITED STATES PATENTS

| | | |
|---|---|---|
| 86,607 | Trout | Feb. 2, 1869 |
| 958,112 | Halliwell et al. | May 17, 1910 |
| 1,114,505 | Moore | Oct. 20, 1914 |
| 1,467,406 | Walker | Sept. 11, 1923 |
| 2,349,400 | Beckwith | May 23, 1944 |
| 2,412,433 | Taylor | Dec. 10, 1946 |
| 2,473,077 | Starbuck | June 14, 1949 |

FOREIGN PATENTS

| | | |
|---|---|---|
| 49,305 | Switzerland | Oct. 25, 1909 |